US009223610B2

(12) United States Patent
Kalmbach et al.

(10) Patent No.: US 9,223,610 B2
(45) Date of Patent: Dec. 29, 2015

(54) MANAGEMENT OF VIRTUAL MACHINE SNAPSHOTS

(75) Inventors: Michael T. Kalmbach, Elgin, MN (US); Dhaval K. Shah, Nadiad (IN)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 12/953,765

(22) Filed: Nov. 24, 2010

(65) Prior Publication Data

US 2012/0131480 A1 May 24, 2012

(51) Int. Cl.
| | |
|---|---|
| G06F 17/30 | (2006.01) |
| G06F 7/00 | (2006.01) |
| G06F 9/46 | (2006.01) |
| G06F 9/50 | (2006.01) |
| G06F 9/445 | (2006.01) |
| G06F 9/44 | (2006.01) |
| G06F 9/455 | (2006.01) |

(52) U.S. Cl.
CPC .. *G06F 9/46* (2013.01); *G06F 8/63* (2013.01); *G06F 9/4446* (2013.01); *G06F 9/5077* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 7,567,991 | B2 | 7/2009 | Armangau et al. | |
| 7,568,080 | B2 * | 7/2009 | Prahlad et al. | 711/162 |
| 8,161,402 | B1 * | 4/2012 | Edson et al. | 715/771 |
| 8,429,140 | B1 * | 4/2013 | Lolayekar et al. | 707/694 |
| 2007/0043860 | A1 * | 2/2007 | Pabari | 709/224 |
| 2009/0288084 | A1 * | 11/2009 | Astete et al. | 718/1 |
| 2009/0307449 | A1 * | 12/2009 | Prahlad et al. | 711/162 |
| 2009/0328225 | A1 * | 12/2009 | Chambers et al. | 726/26 |
| 2010/0070726 | A1 * | 3/2010 | Ngo et al. | 711/162 |
| 2011/0161299 | A1 * | 6/2011 | Prahlad et al. | 707/649 |
| 2011/0213765 | A1 * | 9/2011 | Cui et al. | 707/711 |

FOREIGN PATENT DOCUMENTS

WO 2007021997 A2 2/2007

OTHER PUBLICATIONS

Burkhard et al., "Some Approaches to Best-Match File Searching," Apr. 1973, Communications of the ACM, vol. 16, Issue 4, pp. 230-236.*
http://searchservervirtualization.techtarget.com/sDefinition/0,,sid94_gci213305,00.html, "What is a Virtual Machine Snapshot?", printed Sep. 20, 2010.
http://searchenterprisedesktop.techtarget.com/sDefinition/0,,sid192_gci1323483,00.html, "Virtual Machine", printed Sep. 20, 2010.

* cited by examiner

*Primary Examiner* — Charles Adams
(74) *Attorney, Agent, or Firm* — Martin & Associates, LLC; Derek P. Martin

(57) ABSTRACT

A virtual machine snapshot mechanism takes snapshots of virtual machines on a computer system, generates relationships between a snapshot and resources on the computer system, and provides a graphical display of one or more snapshots that allow visually determining which snapshots include which resources. A user may search the snapshots based on user-specified criteria. If an exact match is not available, and closest match is identified in the graphical display.

6 Claims, 5 Drawing Sheets

MANAGEMENT OF VIRTUAL MACHINE SNAPSHOTS

BACKGROUND

1. Technical Field

This disclosure generally relates to computer systems, and more specifically relates to snapshots in computer systems.

2. Background Art

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments, known as virtual machines. The System i computer system developed by IBM is an example of a computer system that supports multiple virtual machines on a single computer system Snapshots have been used in the prior art to capture state of a computer system, and to store that state for future reference. With the development of virtual machines, snapshots have been applied to virtual machines in the same way as for physical computer systems to indicate state of a virtual machine at a given point in time. A snapshot of a virtual machine allows a user to select and deploy the snapshot, which will create a virtual machine that is representative of the snapshot.

One problem with storing snapshots is the lack of information provided to a user. While the snapshot may include the state of many resources, known snapshots do not reflect which resources are included in a snapshot. A user who is looking at many past snapshots may not know the differences between the snapshots. A user might attempt to remedy this problem by choosing a name for the snapshot that conveys some information about what is in the snapshot. However, a snapshot can include many different computer system resources, so trying to differentiate between snapshots based on their name is not an effective solution. Without a way to display to a user information regarding computer system resources corresponding to stored snapshots, the user will not be able to visually determine differences between snapshots and what is included in snapshots.

BRIEF SUMMARY

A virtual machine snapshot mechanism takes snapshots of virtual machines on a computer system, generates relationships between a snapshot and resources on the computer system, and provides a graphical display of one or more snapshots that allow visually determining which snapshots include which resources. A user may search the snapshots based on user-specified criteria. If an exact match is not available, and closest match is identified in the graphical display.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

The claims and disclosure herein provide a virtual machine snapshot mechanism that takes snapshots of virtual machines on a computer system, generates relationships between a snapshot and resources on the computer system, and provides a graphical display of one or more snapshots that allow visually determining which snapshots include which resources. A user may search the snapshots based on user-specified criteria. If an exact match is not available, and closest match is identified in the graphical display.

Figure 1:
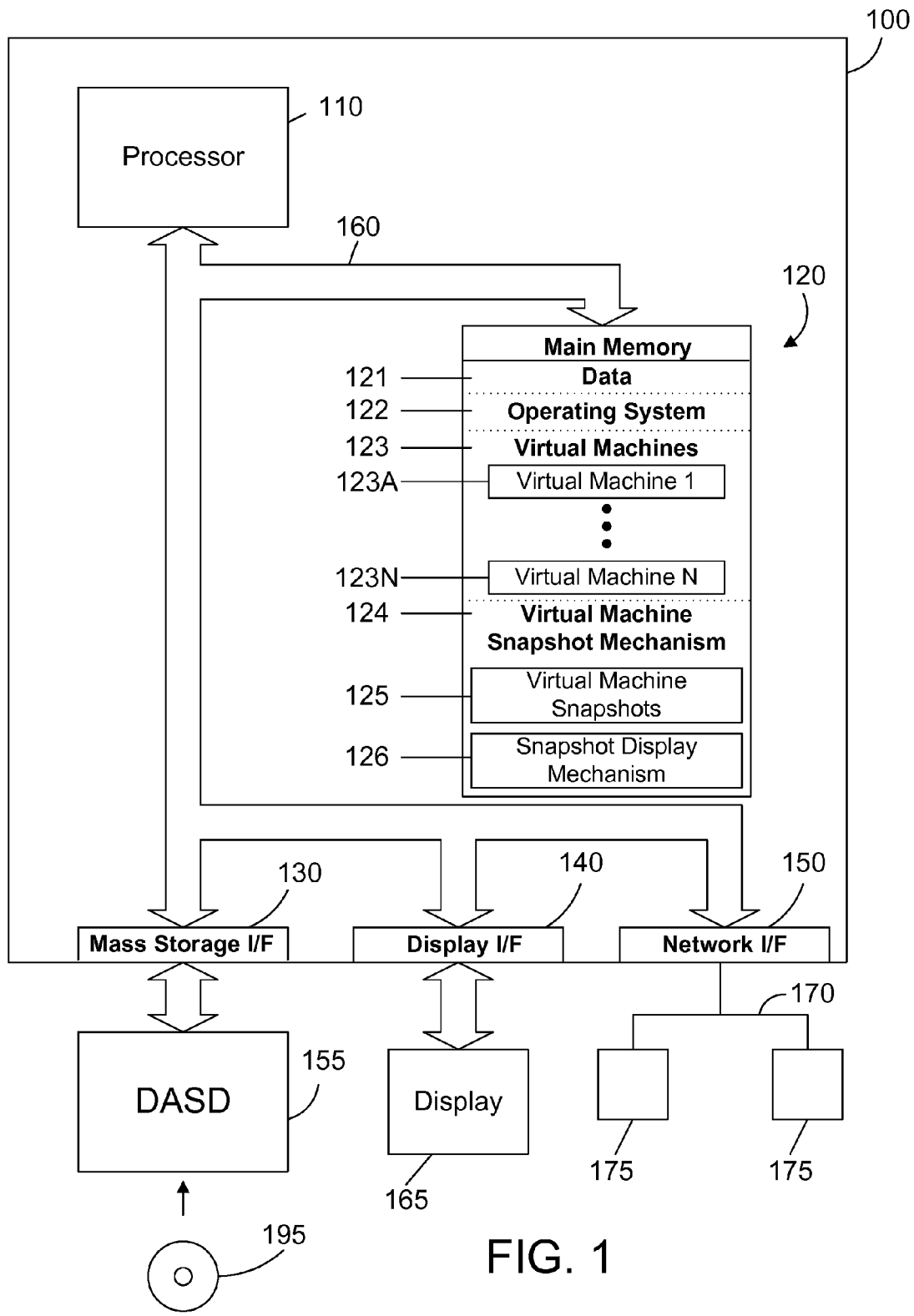
FIG. 1 is a block diagram of an apparatus that includes a virtual machine snapshot mechanism that stores virtual machine snapshots and displays those snapshots in a graphical display so the user can visually determine which snapshots include which computer system resources.

Referring to FIG. 1, a computer system 100 is one suitable implementation of a computer system that includes a virtual machine snapshot mechanism. Computer system 100 is an IBM eServer System i computer system. However, those skilled in the art will appreciate that the disclosure herein applies equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 preferably contains data 121, an operating system 122, virtual machines 123, and a virtual machine snapshot mechanism 124. Data 121 represents any data that serves as input to or output from any program in computer system 100. Operating system 122 is a multitasking operating system. Virtual machines 123 include any suitable number of virtual machines, shown in FIG. 1 as virtual machine 123A, . . . , 123N. The virtual machine snapshot mechanism 124 generates virtual machine snapshots 125, and includes a snapshot display mechanism 126 that displays one or more of the virtual machine snapshots 125 in a graphical display, such as a graphical user interface. The virtual machine snapshots 125 represent state of a virtual machine at a given point in time. The display indicates relationships between a snapshot and resources on the computer system 100. Note the resources may include both hardware and software resources.

The virtual machines 123A, . . . , 123N are shown in FIG. 1 to reside within the main memory 120. However, one skilled in the art will recognize that a virtual machine is a logical construct that includes resources other than memory. A virtual machine typically specifies a portion of memory, along with an assignment of processor capacity and other system resources, such as I/O. Thus, one virtual machine could be defined to include two processors and a portion of memory 120, along with one or more embedded I/O that can provide the functions of mass storage interface 130, display interface 140, network interface 150, or interfaces to I/O adapters or other devices. Another virtual machine could then be defined to include three other processors, a different portion of memory 120, and one or more embedded I/O. The partitions are shown in FIG. 1 to symbolically represent virtual machines, which include system resources outside of memory 120 within computer system 100.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, virtual machines 123 and virtual machine snapshot mechanism 124 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100. In addition, the virtual machine snapshots 125 could be stored on a remote server known as an image repository.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Processor 110 also executes the virtual machine snapshot mechanism 124.

Although computer system 100 is shown to contain only a single processor and a single system bus, those skilled in the art will appreciate that a virtual machine snapshot mechanism may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Display interface 140 is used to directly connect one or more displays 165 to computer system 100. These displays 165, which may be non-intelligent (i.e., dumb) terminals or fully programmable workstations, are used to provide system administrators and users the ability to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect computer system 100 to other computer systems or workstations 175 via network 170. Network interface 150 broadly represents any suitable way to interconnect electronic devices, regardless of whether the network 170 comprises present-day analog and/or digital techniques or via some networking mechanism of the future. Network interface 150 preferably includes a combination of hardware and software that allow communicating on the network 170. Software in the network interface 150 preferably includes a communication manager that manages communication with other computer systems 175 via network 170 using a suitable network protocol. Many different network protocols can be used to implement a network. These protocols are specialized computer programs that allow computers to communicate across a network. TCP/IP (Transmission Control Protocol/Internet Protocol) is an example of a suitable network protocol that may be used by the communication manager within the network interface 150.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the computer system 100 in FIG. 1 shows multiple virtual machines 123 deployed on a single computer system 100 for the sake of illustration, the same principles equally apply to a cloud computing environment. In such an environment, a virtual machine could span multiple computer systems. Dynamic definition of the virtual machine could cause the resources included in the virtual machine across the multiple computer systems to evolve over time. The virtual machine snapshot mechanism 124 could reside on one of the computer systems in the cloud, or could be defined across multiple computer systems. Virtual machine snapshots 125 could include resources in multiple computer systems, and could be deployed to a different set of multiple computer systems. Virtual machines snapshots 125 could also be stored in an image repository that is separate from the computer systems that include the resources in the snapshots. The disclosure and claims herein expressly extend to managing virtual machine snapshots across any suitable combination of hardware and software in any suitable configuration.

Figure 2:
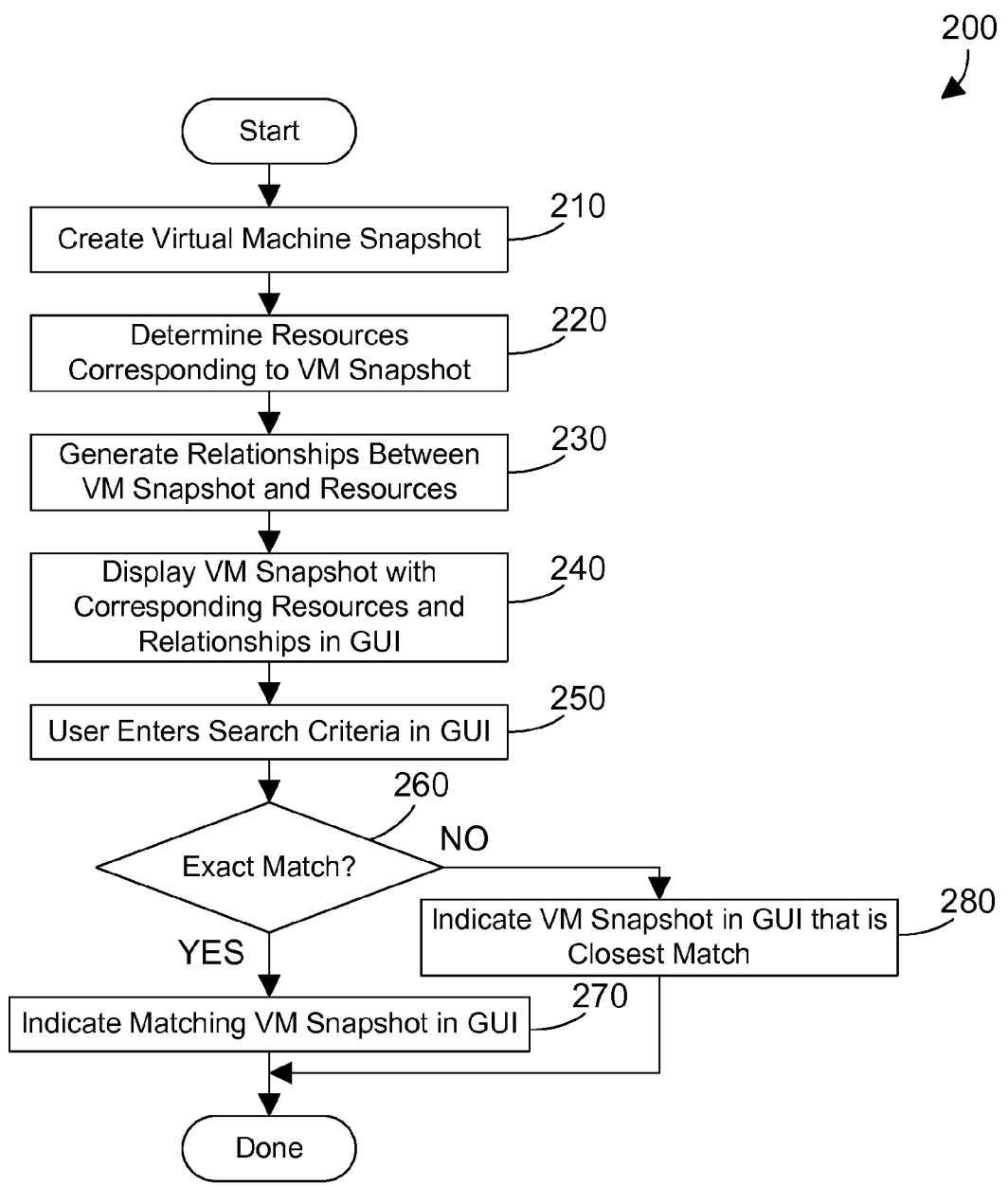
FIG. 2 is a flow diagram of a method for creating, displaying and searching virtual machine snapshots.

Referring to FIG. 2, a method 200 is preferably performed by the virtual machine snapshot mechanism 124 in FIG. 1 when executed by processor 110 in FIG. 1. First, a virtual machine snapshot is created (step 210). The virtual machine snapshot reflects the state of the virtual machine at the time the snapshot is created. Next, the resources corresponding to the virtual machine snapshot are determined (step 220). Relationships between the virtual machine snapshot and resources are then generated (step 230). The virtual machine snapshot with corresponding resources and relationships are then displayed in a graphical display in a graphical user interface (step 240). The user may enter search criteria in the GUI (step 250). If there is a snapshot that is an exact match with the search criteria (step 260=YES), the matching snapshot is indicated in the graphical display (step 270). If there is no exact match (step 260=NO), the snapshot that is the closest match to the search criteria is indicated in the graphical display (step 280). Method 200 is then done. Note the resources in method 200 may include both hardware resources and software resources. Note also the determination of which snapshot is the closest match in step 280 when none of the snapshots are an exact match may be done using any suitable heuristic or criteria. For example, the resources may be weighted, with more critical resources assigned a higher weight than less critical resources, with the match with the highest weight being selected in step 280.

Figure 3:
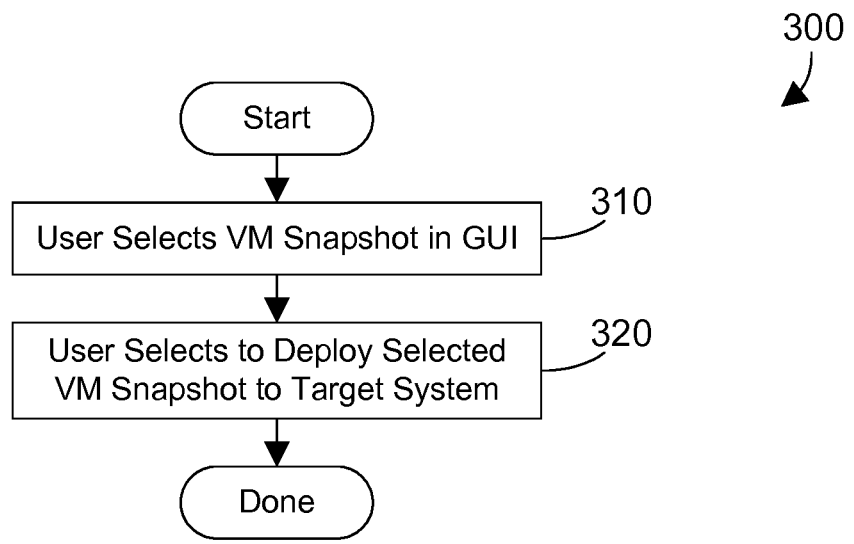
FIG. 3 is a flow diagram of a method for a user to deploy a virtual machine represented by a snapshot to a target system.

Referring to FIG. 3, a method 300 may be performed once the snapshot and its corresponding resources and relationships are displayed in the graphical display in step 240 in FIG. 2. A user selects a virtual memory snapshot in the graphical display (step 310). The user then selects to deploy the selected virtual machine snapshot to a target system (step 320). Note the term "target system" means any suitable virtual machine, whether the virtual machine is on the same computer system, on a different computer system, or spans multiple computer systems.

Figure 4:
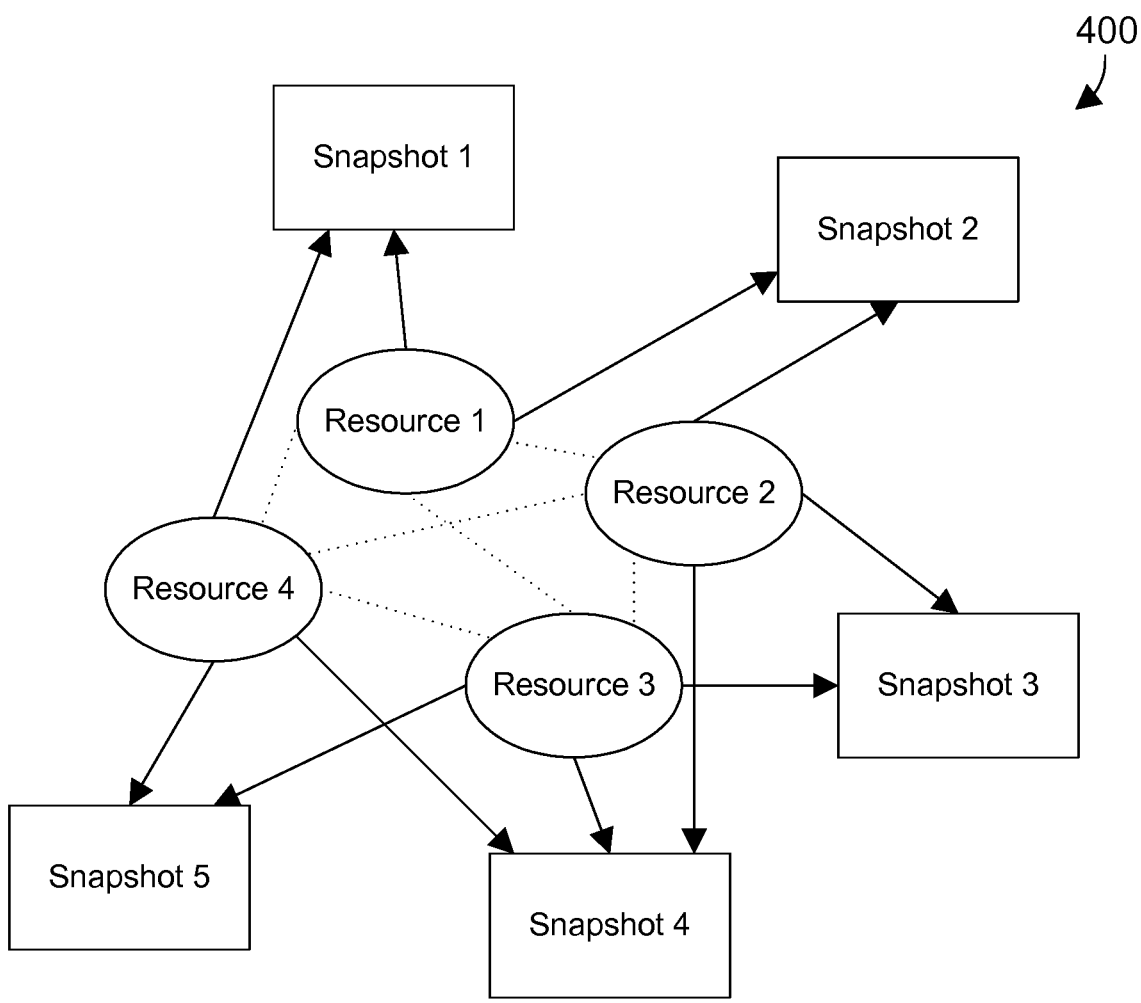
FIG. 4 is a sample graphical display of multiple snapshots that shows which resources correspond to each snapshot.

One suitable example of a graphical display of snapshots and corresponding resources and relationships is shown in display 400 of FIG. 4. Each snapshot includes arrows from resources corresponding to the snapshot. Thus, Snapshot 1 includes Resource 1 and Resource 4. Snapshot 2 includes Resource 1 and Resource 2. Snapshot 3 includes Resource 2 and Resource 3. Snapshot 4 includes Resource 2, Resource 3 and Resource 4. Snapshot 5 includes Resource 3 and Resource 4. The arrows from the resources to each snapshot visually indicate in the graphical display 400 the resources corresponding to each snapshot. Note also the dotted lines in display 400 may optionally be included to indicate relationships between resources. Thus, if two resources are mutually-exclusive, they will not have a dotted line connecting them in display 400. When two resources are connected with a dotted line, this means there is a relationship between the resources.

Figure 5:
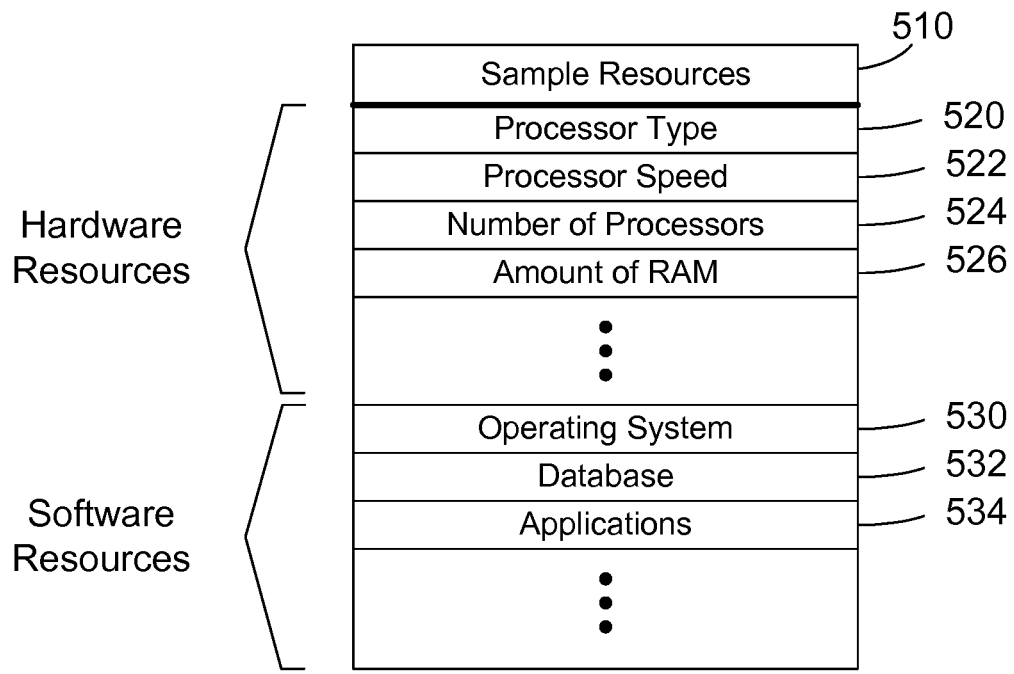
FIG. 5 is a diagram showing sample resources in a computer system.

FIG. 5 shows a table 510 of sample resources. Sample hardware resources include processor type 520, processor speed 522, number of processors 524, amount of Random Access Memory (RAM) 526, etc. Of course, other hardware resources could also be included, such as hard disk size, a particular graphics card, a particular I/O card, etc. Sample software resources include operating system 530, database 532, applications 534, etc. Note the applications 534 could be individually listed as sample resources, with each individual application being a software resource that may correspond to a snapshot. Of course, other software resources could also be included. The disclosure and claims herein expressly extend to any suitable hardware or software resource that can be included in or otherwise correspond to a virtual machine snapshot.

Figure 6:
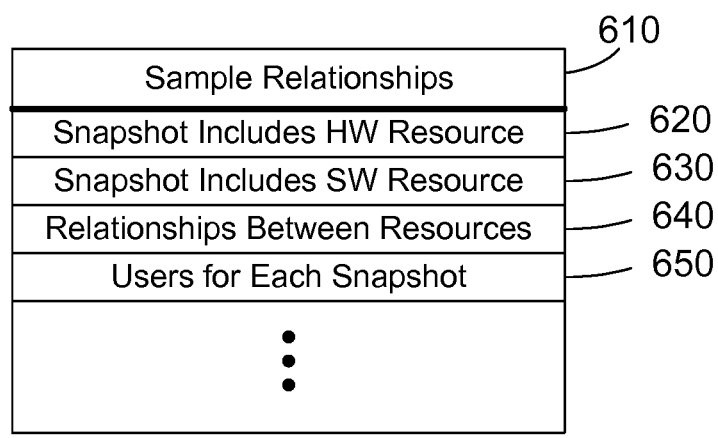
FIG. 6 is a diagram showing sample relationships in a snapshot that may be represented in the graphical display.
Figure 7:
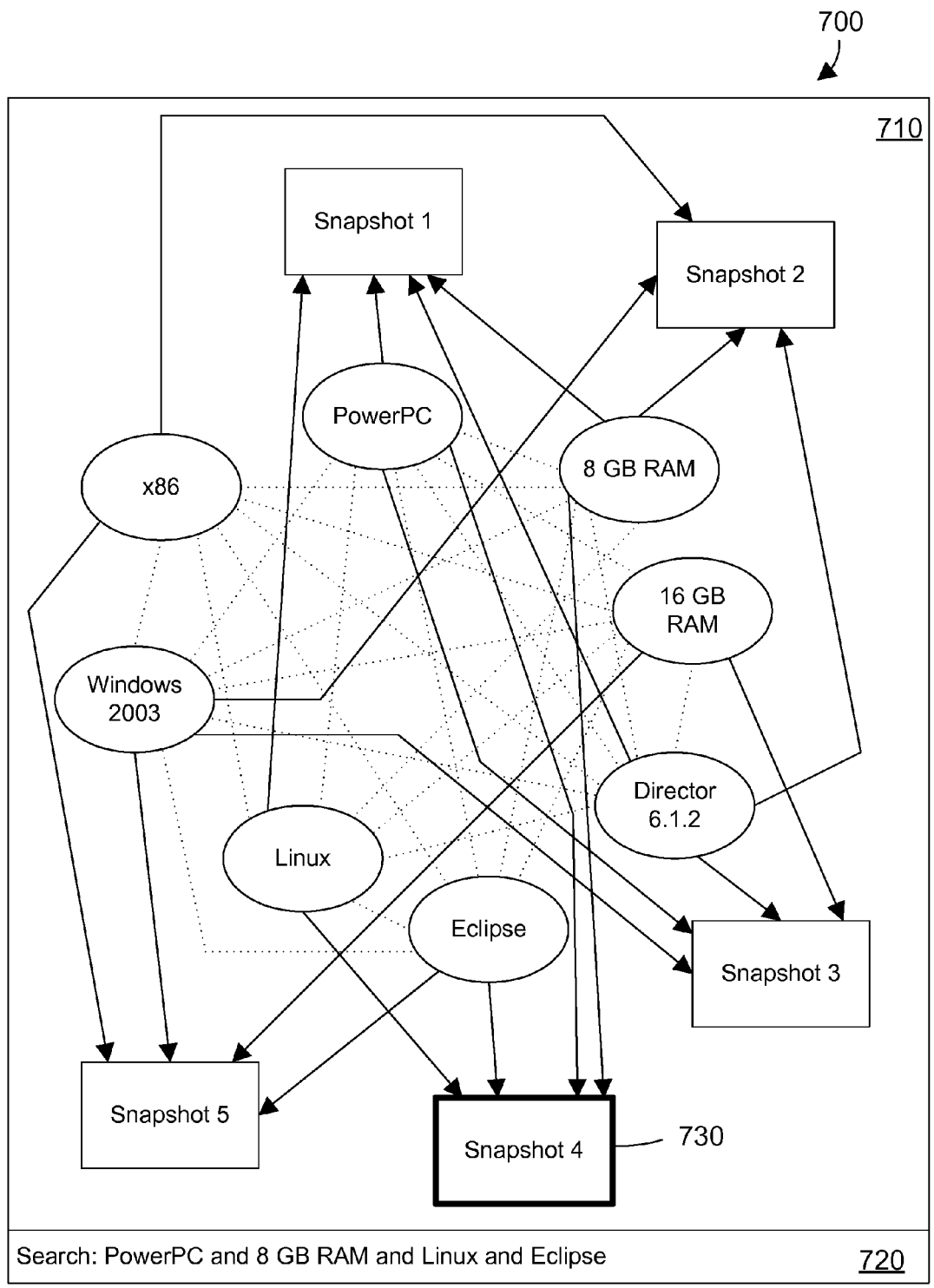
FIG. 7 is a sample graphical display of multiple snapshots and multiple hardware and software resources that shows which resources correspond to each snapshot.

FIG. 6 shows a table 610 of sample relationships. One sample relationship is that a snapshot includes a hardware resource 620. Another is a snapshot includes a software resource 630. Relationships 620 and 630 in FIG. 6 are represented in FIGS. 4 and 7 as lines with arrows. Another sample relationship is relationships between resources 640, as shown by the dotted lines in FIGS. 4 and 7. Yet another sample relationship is users for each snapshot 650. While this relationship is not included in FIGS. 4 and 7, by showing the users for each snapshot, a user of the virtual machine snapshot mechanism 124 can visually see which users are using which snapshots. Thus, a user that is new to a group can quickly and easily find a snapshot that is used by other members of his group. Of course, many other relationships could be displayed in the graphical representation, and the disclosure and claims herein expressly extend to any suitable relationship that may be indicated in the graphical display.

Referring to FIG. 7, a graphical user interface 700 includes a sample graphical display 710 and a search bar 720. This specific example assumes virtual machines exist that have either a PowerPC architecture or an x86 architecture, that include either 8 GB or 16 GB RAM, that have the Windows 2003 or Linux operating system, and that may include an application called Eclipse or an application called Director 6.1.2. The arrows between the resources and the snapshots graphically indicate what is included in the snapshot. Thus, Snapshot 1 includes the Linux operating system, a PowerPC processor, Director 6.1.2, and 8 GB RAM. Snapshot 2 includes an x86 processor, Windows 2003 operating system, 8 GB RAM, and Director 6.1.2. Snapshot 3 includes Windows 2003 operating system, a PowerPC processor, Director 6.1.2, and 16 GB RAM. Snapshot 4 includes the Linux operating system, Eclipse, a PowerPC processor, and 8 GB RAM. Snapshot 5 includes an x86 processor, Windows 2003 operating system, 16 GB RAM, and Eclipse. The dotted lines in graphical display 710 in FIG. 7 represent relationships between resources. We assume for this example a given virtual machine can have either an x86 processor or a PowerPC processor, but not both. As a result, there is no dotted line between the x86 resource and the PowerPC resource in the graphical display 710. In similar fashion, we assume a virtual machine will have either 8 GB RAM or 16 GB RAM, but not both, so there is no dotted line between the 8 GB RAM resource and the 16 GB RAM resource in the graphical display 710. Similarly, we assume a virtual machine will have either Director 6.1.2 or Eclipse, but not both, so there is no dotted line between the Director 6.1.2 resource and the Eclipse resource in the graphical display 710. We also assume a virtual machine will have either Windows 2003 or Linux, but not both, so there is no dotted line between the Windows 2003 resource and the Linux resource in the graphical display 710.

The search bar 720 provides a way for a user to enter search criteria for locating a snapshot of interest (see step 250 in FIG. 2). In the example in FIG. 7, the user has specified to search for a snapshot that includes a Power PC processor, 8 GB RAM, Linux and Eclipse. Snapshot 4 meets all of these criteria, so Snapshot 4 is an exact match. Snapshot 4 will be indicated in the graphical display 710 as meeting the search criteria. In the example in FIG. 7, Snapshot 4 is indicated by the bold line at 730. Note the matching snapshot could be indicated using any suitable display technique, including a different color, bold, italics, flashing video, etc.

The disclosure and claims disclose a virtual machine snapshot mechanism that takes snapshots of virtual machines on a computer system, generates relationships between a snapshot and resources on the computer system, and provides a graphical display of one or more snapshots that allow visually determining which snapshots include which resources. A user may search the snapshots based on user-specified criteria. If an exact match is not available, and closest match is identified in the graphical display.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
at least one processor;
memory coupled to the at least one processor;
plurality of hardware resources;
a plurality of software resources;
a plurality of virtual machines executed by the at least one processor, each virtual machine comprising at least two of the plurality of hardware resources and at least two of the plurality of software resources; and
a virtual machine snapshot mechanism executing on the apparatus that generates a first snapshot of a first of the plurality of virtual machines that indicates state of the first virtual machine at a first given point in time, determines which of the plurality of hardware resources and which of the plurality of software resources correspond to the first snapshot by being executed by the first virtual machine, generates a first plurality of relationships between the first snapshot and the corresponding hardware and software resources, generates a second snapshot of a second of the plurality of virtual machines that indicates state of the second virtual machine at a second given point in time, determines which of the plurality of hardware and software resources correspond to the second snapshot by being executed by the second virtual machine, generates a second plurality of relationships between the second snapshot and the corresponding hardware and software resources, displays the first snapshot and the second snapshot with the hardware and software resources corresponding to the first snapshot and the second snapshot and the first plurality of relationships and the second plurality of relationships in a graphical display in a graphical user interface, where each hardware resource and each software resource in the first and second snapshots is displayed only once in the graphical display, where the graphical display indicates by the displayed first plurality of relationships which hardware and software resources correspond to the first snapshot and indicates by the displayed second plurality of relationships which hardware and software resources correspond to the second snapshot, wherein the first plurality of relationships is represented by a first plurality of lines that connect the first snapshot in the graphical display to each of the first corresponding hardware and software resources in the graphical display and the second plurality of relationships is represented by a second plurality of lines that connect the second snapshot in the graphical display to each of the second corresponding hardware and software resources in the graphical display, wherein the virtual machine snapshot mechanism allows a user to enter search criteria, and in response, indicates in the graphical display one of a plurality of snapshots that includes the first and second snapshots that matches the search criteria, wherein the one of the plurality of snapshots does not exactly match the search criteria and is a closest match to the search criteria, wherein the user selects one of the plurality of snapshots in the graphical display and selects to deploy the selected snapshot on a target system.

2. The apparatus of claim 1 wherein the plurality of snapshots each includes at least one relationship that indicates at least one user for the snapshot, and wherein the graphical display indicates the at least one user for at least one of the plurality of snapshots.

3. A computer-implemented method for handling snapshots of a plurality of virtual machines on a computer apparatus, the method comprising the steps of:
  providing a plurality of hardware resources;
  providing a plurality of software resources;
  defining a plurality of virtual machines on the computer apparatus, each virtual machine comprising at least two of the plurality of hardware resources and at least two of the plurality of software resources;
  providing a virtual machine snapshot mechanism, the virtual machine snapshot mechanism performing the steps of:
    generating a first snapshot of a first of the plurality of virtual machines that indicates state of the first virtual machine at a first given point in time;
    determining which of the plurality of hardware resources and which of the plurality of software resources correspond to the first snapshot by being executed by the first virtual machine;
    generating a first plurality of relationships between the first snapshot and the corresponding hardware and software resources;
    generating a second snapshot of a second of the plurality of virtual machines that indicates state of the second virtual machine at a second given point in time;
    determining which of the plurality of hardware and software resources correspond to the second snapshot by being executed by the second virtual machine;
    generating a second plurality of relationships between the second snapshot and the corresponding hardware and software resources;
    displaying the first snapshot and the second snapshot with the hardware and software resources corresponding to the first snapshot and the second snapshot and the first plurality of relationships and the second plurality of relationships in a graphical display in a graphical user interface, where each hardware resource and each software resource in the first and second snapshots is displayed only once in the graphical display, where the graphical display indicates by the displayed first plurality of relationships which hardware and software resources correspond to the first snapshot and indicates by the displayed second plurality of relationships which hardware and software resources correspond to the second snapshot, wherein the first plurality of relationships is represented by a first plurality of lines that connect the first snapshot in the graphical display to each of the first corresponding hardware and software resources in the graphical display and the second plurality of relationships is represented by a second plurality of lines that connect the second snapshot in the graphical display to each of the second corresponding hardware and software resources in the graphical display;
    allowing a user to enter search criteria;
    indicating in the graphical display one of a plurality of snapshots that includes the first and second snapshots that matches the search criteria, wherein the one of the plurality of snapshots does not exactly match the search criteria and is a closest match to the search criteria;
    the user selecting one of the plurality of snapshots in the graphical display; and
    the user selecting to deploy the selected snapshot on a target system.

4. The method of claim 3 wherein the plurality of snapshots each includes at least one relationship that indicates at least one user for the snapshot, and wherein the graphical display indicates the at least one user for at least one of the plurality of snapshots.

5. An article of manufacture comprising software stored on a non-transitory computer readable storage medium, the software comprising:
  a virtual machine snapshot mechanism that generates a first snapshot of a first of a plurality of virtual machines defined on a computer apparatus that indicates state of the first virtual machine at a first given point in time, each virtual machine comprising at least two of a plurality of hardware resources and at least two of a plurality of software resources, the virtual machine snapshot mechanism determining which of the plurality of hardware resources and which of the plurality of software resources correspond to the first snapshot, generating a first plurality of relationships between the first snapshot and the corresponding hardware and software resources, generating a second snapshot of a second of the plurality of virtual machines that indicates state of the second virtual machine at a second given point in time, determining which of the plurality of hardware and software resources correspond to the second snapshot, generating a second plurality of relationships between the second snapshot and the corresponding hardware and software resources, and displaying the first snapshot and the second snapshot with the hardware and software resources corresponding to the first snapshot and the second snapshot and the first plurality of relationships and the second plurality of relationships in a graphical display in a graphical user interface, where each hardware resource and each software resource in the first and second snapshots is displayed only once in the graphical display, where the graphical display indicates by the displayed first plurality of relationships which hardware and software resources correspond to the first snapshot and indicates by the displayed second plurality of relationships which hardware and software resources correspond to the second snapshot, wherein the first plurality of relationships is represented by a first plurality of lines that connect the first snapshot in the graphical display to each of the first corresponding hardware and software resources in the graphical display and the second plurality of relationships is represented by a second plurality of lines that connect the second snapshot in the graphical display to each of the second corresponding hardware and software resources in the graphical display, wherein the virtual machine snapshot mechanism allows a user to enter search criteria, and in response, indicates in the graphical display one of a plurality of snapshots that includes the first and second snapshots that matches the search criteria, wherein the one of the plurality of snapshots does not exactly match the search criteria and is a closest match to the search criteria, wherein the user selects one of the plurality of snapshots in the graphical display and selects to deploy the selected snapshot on a target system.

6. The article of manufacture of claim 5 wherein the plurality of snapshots each includes at least one relationship that indicates at least one user for the snapshot, and wherein the graphical display indicates the at least one user for at least one of the plurality of snapshots.

* * * * *